United States Patent
Chang et al.

(10) Patent No.: US 11,644,683 B2
(45) Date of Patent: May 9, 2023

(54) OPTICAL ELEMENT INCLUDING AT LEAST TWO DIFFRACTIVE LAYERS

(71) Applicant: HIMAX TECHNOLOGIES LIMITED, Tainan (TW)

(72) Inventors: Chih-Sheng Chang, Tainan (TW); Meng-Ko Tsai, Tainan (TW); Teng-Te Huang, Tainan (TW); Yin-Dong Lu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 274 days.

(21) Appl. No.: 16/903,397

(22) Filed: Jun. 17, 2020

(65) Prior Publication Data
US 2021/0397012 A1    Dec. 23, 2021

(51) Int. Cl.
G02B 27/42 (2006.01)
G02B 5/18 (2006.01)
G06V 40/16 (2022.01)

(52) U.S. Cl.
CPC .............. *G02B 27/425* (2013.01); *G02B 5/18* (2013.01); *G02B 5/1814* (2013.01); *G02B 27/4277* (2013.01); *G06V 40/16* (2022.01)

(58) Field of Classification Search
CPC ...... G02B 27/425; G02B 5/18; G02B 5/1814; G02B 27/4277; G02B 2005/1804; G02B 5/1847; G02B 5/1866; G02B 27/42; G02B 27/4272; G02B 27/44; G06V 40/16
USPC ........ 359/558, 566, 569, 571, 574, 575, 576
See application file for complete search history.

(56) References Cited

U.S. PATENT DOCUMENTS

| | | | |
|---|---|---|---|
| 8,040,778 B2 | 10/2011 | Nashi | |
| 2001/0050815 A1 | 12/2001 | Ishihara et al. | |
| 2011/0181957 A1* | 7/2011 | Iizuka | G02B 26/02 |
| | | | 359/573 |
| 2012/0223218 A1 | 9/2012 | Miyasaka et al. | |
| 2019/0086682 A1 | 3/2019 | Miller et al. | |
| 2019/0243155 A1 | 8/2019 | You et al. | |
| 2021/0181390 A1* | 6/2021 | Liu | G02B 27/4272 |

FOREIGN PATENT DOCUMENTS

| | | | | |
|---|---|---|---|---|
| CN | 107257938 A | * | 10/2017 | ............. C03B 23/20 |
| CN | 109407190 A | | 3/2019 | |
| CN | 109521507 A | | 3/2019 | |
| DE | 102016116747 A1 | * | 3/2018 | ......... G02B 27/0916 |
| EP | 965864 A2 | * | 12/1999 | ........... G02B 5/1866 |
| EP | 3550340 A1 | | 10/2019 | |
| JP | 2007-234094 A | | 9/2007 | |
| TW | I500969 B | | 9/2015 | |
| TW | 201942568 A | | 11/2019 | |

* cited by examiner

*Primary Examiner* — Arnel C Lavarias
(74) *Attorney, Agent, or Firm* — CKC & Partners Co., LLC

(57) ABSTRACT

The optical component includes a first substrate, a first diffractive layer formed on the first substrate, a second substrate, a second diffractive layer formed on the second substrate, and a bonding material disposed between the first substrate and the second substrate and connecting the first substrate and the second substrate. The second diffractive layer is disposed opposite to the first diffractive layer, and both the first diffractive layer and the second diffractive layer are located between the first substrate and the second substrate. A gap is formed between the first diffractive layer and the second diffractive layer.

12 Claims, 3 Drawing Sheets

OPTICAL ELEMENT INCLUDING AT LEAST TWO DIFFRACTIVE LAYERS

BACKGROUND

Field of Invention

The present invention relates to an optical element. More particularly, the present invention relates to an optical element including at least two diffractive layers.

Description of Related Art

A current diffractive optical element, which is abbreviated as DOE, can be used for facial recognition. Specifically, the DOE can project a pattern having a plurality of light spots, which may be called "dots", on a human face when the light hits the DOE. An image sensor can sense the light spots. Then, a processor can recognize the human face based on the light spots. A conventional DOE is substantially a single-layer diffractive structure, which can generate the light spots. A current facial recognition usually uses a lot of light spots, so that the conventional DOE needs a complicated single-layer diffractive structure to generate more light spots.

SUMMARY

The invention provides an optical element including two diffractive layers to generate a plurality of light spots.

According to an embodiment of the present invention, the optical component includes a first substrate, a first diffractive layer formed on the first substrate, a second substrate, a second diffractive layer formed on the second substrate, and a bonding material disposed between the first substrate and the second substrate and connecting the first substrate and the second substrate. The second diffractive layer is disposed opposite to the first diffractive layer, and both the first diffractive layer and the second diffractive layer are located between the first substrate and the second substrate. A gap is formed between the first diffractive layer and the second diffractive layer.

Accordingly, by at least the first diffractive layer and the second diffractive layer, the optical component can project a plurality of light spots (i.e., dots) for facial recognition.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
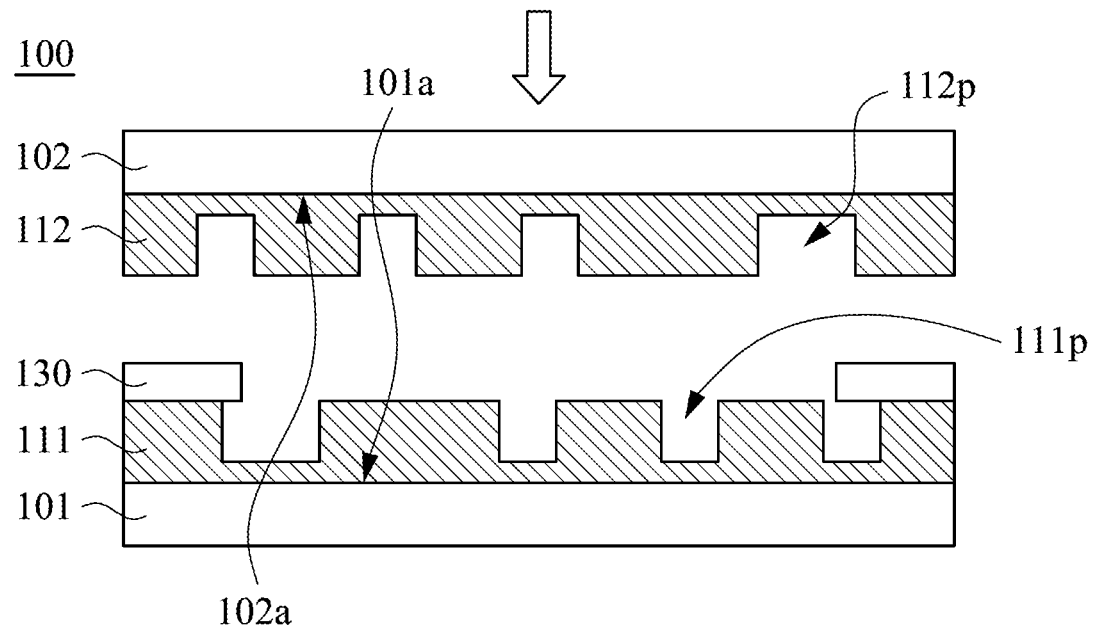
FIGS. 1A and 1B are cross-sectional views of manufacturing an optical component according to an embodiment of the present invention.

The present invention will now be described more specifically with reference to the following embodiments. It is to be noted that the following descriptions of embodiments of this invention are presented herein for purpose of illustration and description only. It is not intended to be exhaustive or to be limited to the precise form disclosed. Wherever possible, the same reference numbers are used in the drawings and the description to refer to the same or like parts.

Figure 1B:
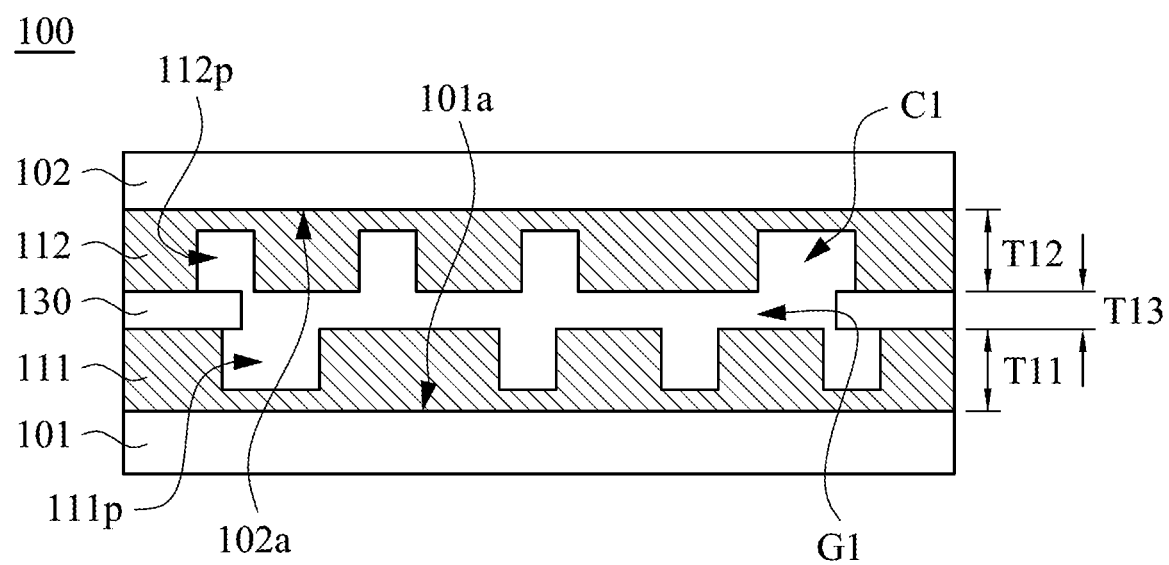

FIGS. 1A and 1B are cross-sectional views of manufacturing an optical component according to an embodiment of the present invention. Referring to FIGS. 1A and 1B, an optical component 100 includes a first substrate 101, a second substrate 102, and a bonding material 130. The first substrate 101 and the second substrate 102 may be transparent. For example, the first substrate 101 and the second substrate 102 may be glass plates or transparent plastic substrates, so both the first substrate 101 and the second substrate 102 can allow light to pass through.

The bonding material 130 is disposed between the first substrate 101 and the second substrate 102, where the bonding material 130 connects the first substrate 101 and the second substrate 102. Specifically, the bonding material 130 may be an adhesive, such as photo-curing epoxy resin or thermal curing epoxy resin. Hence, the first substrate 101 can be attached to the second substrate 102 by the bonding material 130. In the method of manufacturing the optical component 100, the bonding material 130 can be applied to the first substrate 101, as illustrated in FIG. 1A. Then, the second substrate 102 can be pressed against to the bonding material 130 and the first substrate 101, thereby bonding or connecting the first substrate 101 and the second substrate 102.

The optical component 100 further includes a first diffractive layer 111 and a second diffractive layer 112. The first diffractive layer 111 is formed on the first substrate 101, whereas the second diffractive layer 112 is formed on the second substrate 102. Specifically, the first substrate 101 has an inner surface 101a, and the second substrate 102 has an inner surface 102a, where the inner surface 101a faces to the inner surface 102a. The first diffractive layer 111 is formed on the inner surface 101a of the first substrate 101, whereas the second diffractive layer 112 is formed on the inner surface 102a of the second substrate 102, so the second diffractive layer 112 is disposed opposite to the first diffractive layer 111. In other words, the first diffractive layer 111 and the second diffractive layer 112 are disposed face-to-face.

Accordingly, the first diffractive layer 111 and the second diffractive layer 112 are located between the first substrate 101 and the second substrate 102. In addition, the thickness T11 of the first diffractive layer 111 may range between 1 μm and 100 μm, whereas the thickness T12 of the second diffractive layer 112 may range between 1 μm and 100 μm, where the thicknesses T11 and T12 may be substantially equal or not substantially equal. However, the thicknesses T11 and T12 are not limited to the precious ranges.

Referring to FIG. 1B, the bonding material 130 may be formed between the first diffractive layer 111 and the second diffractive layer 112, and connected to the first diffractive layer 111 and the second diffractive layer 112. In the embodiment as illustrated in FIG. 1B, the bonding material 130 may be sandwiched between the first diffractive layer 111 and the second diffractive layer 112, so the bonding material 130 can separate the first diffractive layer 111 and the second diffractive layer 112, thereby forming a gap G1 between the first diffractive layer 111 and the second diffractive layer 112. Hence, the first diffractive layer 111 is disposed apart from the second diffractive layer 112. Moreover, the width T13 of the gap G1 may range between 0.1 µm and 500 µm, but not be limited.

The first substrate 101, the second substrate 102, and the bonding material 130 can define a cavity C1, where the gap G1 is formed within the cavity C1. In one embodiment, the air can fill the cavity C1 so that the cavity C1 has no vacuum. However, in another embodiment, the cavity C1 may have a vacuum or a very low pressure, so the pressure within the cavity C1 is lower than 1 atm. Hence, the cavity C1 is not limited to being full of any gas (e.g., air).

The first diffractive layer 111 has a first pattern 111p, whereas the second diffractive layer 112 has a second pattern 112p, in which the first pattern 111p and the second pattern 112p are formed face to face. The first pattern 111p has a plurality of first depressions (not labeled), and the second pattern 112p has a plurality of second depressions (not labeled). Both the first depressions and the second depressions may include a plurality of trenches and/or a plurality of holes. Moreover, in the embodiment of FIG. 1B, the first pattern 111p may be different from the second pattern 112p. However, in another embodiment, the first pattern 111p may be similar to or the same as the second pattern 112p.

In addition, the first diffractive layer 111 may completely cover the inner surface 101a of the first substrate 101, and the second diffractive layer 112 may completely cover the inner surface 102a of the second substrate 102. Hence, the first pattern 111p and the second pattern 112p do not expose the inner surfaces 101a and 102a respectively. In addition, the first depressions of the first diffractive layer 111 and the second depressions of the second diffractive layer 112 can be made by nanoimprinting or other proper means.

Both the first diffractive layer 111 and the second diffractive layer 112 can be made of polymer, such as resin. The first diffractive layer 111 and the second diffractive layer 112 may be made of the same material so that the first diffractive layer 111 and the second diffractive layer 112 both have the same refractive index. In the embodiment, there may be an about or over 0.3 refractive index difference between the cavity C1 (including the gap G1) and at least one of the first diffractive layer 111 and the second diffractive layer 112, thereby improving the optical efficacy. However, the refractive index difference between the cavity C1 and at least one of the first diffractive layer 111 and the second diffractive layer 112 may be below 0.3 and thus not limited to 0.3 or over 0.3.

Since the optical component 100 includes two diffractive layers: the first diffractive layer 111 and the second diffractive layer 112, the optical component 100 can project a plurality of light spots (i.e., dots) even if both the first pattern 111p and the second pattern 112p are designed simple structures or simple patterns. Compared with the conventional DOE having the complicated single-layer diffractive structure, the optical component 100 may have at least two simple single-layer diffractive structures (i.e., the first diffractive layer 111 and the second diffractive layer 112) to improve the optical efficacy. Therefore, the optical component 100 of the embodiment which may have lower manufacturing cost can generate a plurality of light spots for facial recognition.

It is noted that the optical component 100 may further include at least one additional diffractive layer in other embodiment. In other words, the total number of the diffractive layers (e.g., the first diffractive layer 111 and the second diffractive layer 112) included by the optical component 100 may be three or more than three, and not limited to two. Hence, the optical component 100 can include two, three, or more than three diffractive layers.

Figure 2A:
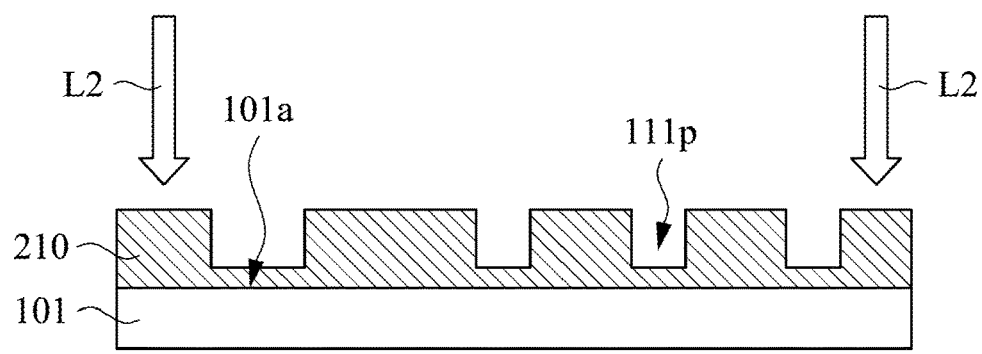
FIGS. 2A to 2D are cross-sectional views of manufacturing an optical component according to another embodiment of the present invention.
Figure 2B:
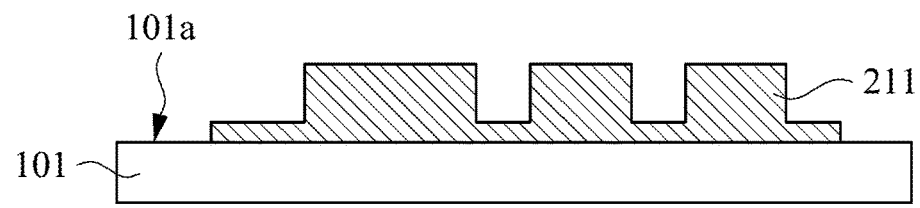
Figure 2C:
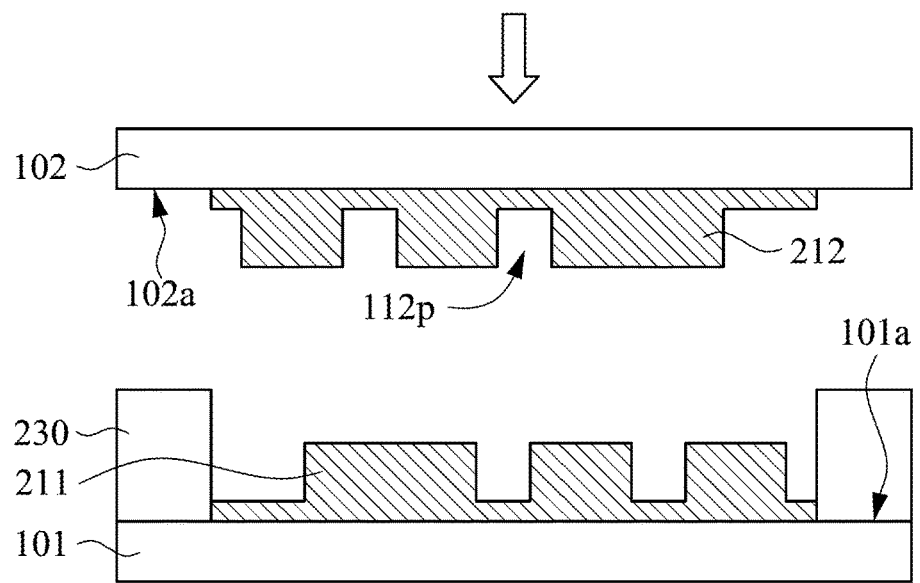
Figure 2D:
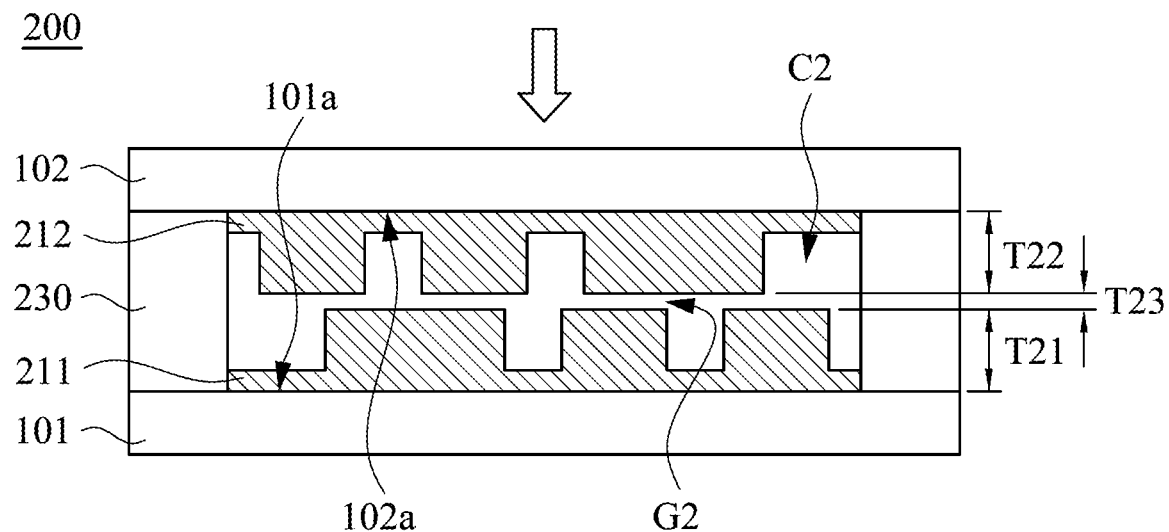

FIGS. 2A to 2D are cross-sectional views of manufacturing an optical component according to another embodiment of the present invention, where FIG. 2D illustrates a cross-sectional view of another optical component 200. Referring to FIG. 2D, the optical component 200 in FIG. 2D is similar to the optical component 100 of the previous embodiment as shown in FIG. 1B. For example, both the optical components 100 and 200 have the same elements: the first substrate 101 and the second substrate 102. The following description mainly describes the difference between the optical components 100 and 200.

In the optical component 200 as shown in FIG. 2D, the bonding material 230 is directly connected to the first substrate 101 and the second substrate 102. Particularly, the bonding material 230 may be an adhesive and the same as the bonding material 130. The bonding material 230 touches the inner surface 101a of the first substrate 101 and the inner surface 102a of the second substrate 102, so the first substrate 101 can be attached to the second substrate 102 by the bonding material 230. In addition, the bonding material 230 may surround the first diffractive layer 211 and the second diffractive layer 212, thereby encapsulating the first diffractive layer 211 and the second diffractive layer 212. Hence, the bonding material 230 can protect the first diffractive layer 211 and the second diffractive layer 212 from dust or water vapor.

In the embodiment as illustrated in FIG. 2D, the thickness T21 of the first diffractive layer 211 may range between 1 µm and 100 µm, whereas the thickness T22 of the second diffractive layer 212 may range between 1 µm and 100 µm, where the thicknesses T21 and T22 may be substantially equal or not substantially equal. However, the thicknesses T21 and T22 are not limited to the precious ranges. In addition, the width T23 of the gap G2 between the first diffractive layer 211 and the second diffractive layer 212 may range between 0 µm and 500 µm, but not be limited.

Referring to FIGS. 2A and 2B, in the method of manufacturing the optical component 200, part of the first diffractive layer 210 is removed after the first pattern 111p is formed in the first diffractive layer 210, in which the first diffractive layer 210 may be the same as the first diffractive layer 111. The removed part at the edge of the first diffractive layer 210, and a laser beam L2 can be used for removing the part of the first diffractive layer 210. After the part at the edge of the first diffractive layer 210 is removed, part of the inner surface 101a is exposed, as illustrated in FIG. 2B.

Referring to FIG. 2C, the second substrate 102 and the second diffractive layer 212 formed thereon are provided, in which the second diffractive layer 212 has the second pattern 112p, and part of the inner surface 102a is exposed, as illustrated in FIG. 2C. The methods of forming the first diffractive layer 211 and the second diffractive layer 212 may be similar, so the second diffractive layer 212 can be formed by removing part of the original second diffractive layer 212, where the remover part is at the edge of the second substrate 102, and the laser beam L2 can be used for the removal.

The bonding material 230 can be applied to the inner surface 101a of the first substrate 101 and at the edge of the first substrate 101, so the applied bonding material 230 can touch the inner surface 101a and surround the first diffractive layer 211. Referring to FIGS. 2C and 2D, afterwards, the second substrate 102 can be pressed against the bonding material 230 and the first substrate 101, thereby bonding or connecting the first substrate 101 and the second substrate 102. So far, the optical component 200 is basically complete.

Figure 3:
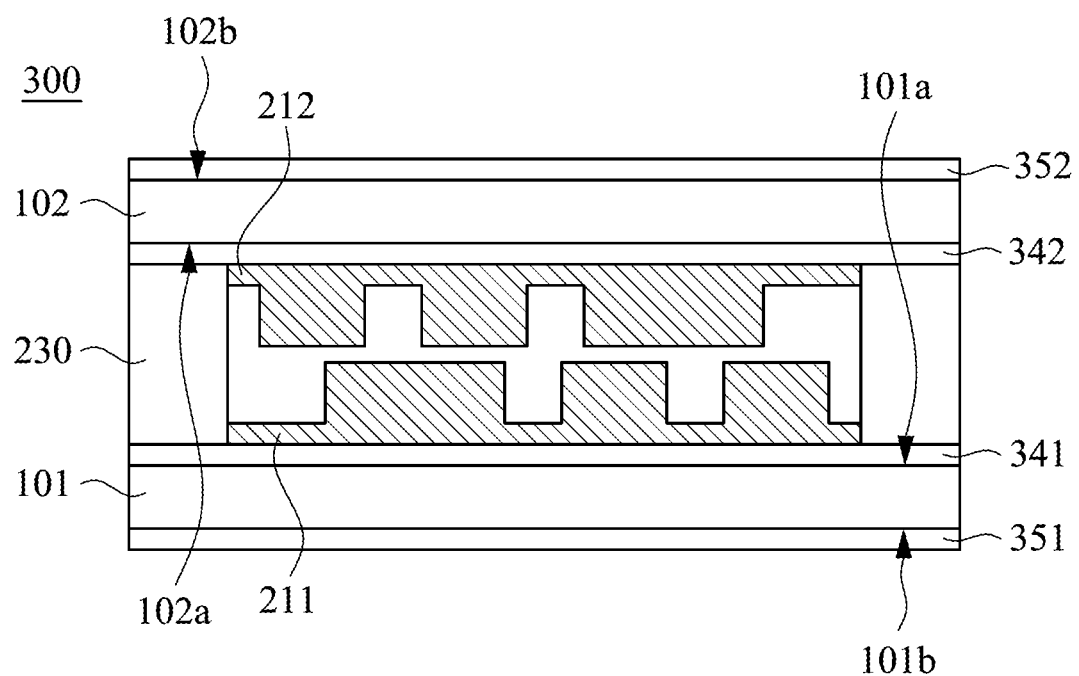
FIG. 3 is a cross-sectional view of an optical component according to another embodiment of the present invention.

FIG. 3 is a cross-sectional view of an optical component according to another embodiment of the present invention. Referring to FIG. 3, the optical component 300 illustrated in FIG. 3 is similar to the optical component 200 illustrated in FIG. 2D, so the following description mainly describes the difference between the optical components 200 and 300. The same or similar features are basically not described again.

Specifically, the optical component 300 includes a first index matching layer 341 and a second index matching layer 342. The first index matching layer 341 is formed between the first substrate 101 and the first diffractive layer 211. Moreover, the first index matching layer 341 is formed on the inner surface 101a. Similarly, the second index matching layer 342 is formed between the second substrate 102 and the second diffractive layer 212. Furthermore, the second index matching layer 342 is formed on the inner surface 102a.

The refractive index of the first index matching layer 341 ranges between the refractive indices of the first diffractive layer 211 and the first substrate 101. Similarly, the refractive index of the second index matching layer 342 ranges between the refractive indices of the second diffractive layer 212 and the second substrate 102. Accordingly, the first index matching layer 341 can reduce the variation in refractive index between the first diffractive layer 211 and the first substrate 101 for reducing the loss of energy of light. Likewise, the second index matching layer 342 also can reduce the variation in refractive index between the second diffractive layer 212 and the second substrate 102 for reducing the loss of energy of light.

The optical component 300 further includes a first antireflection layer 351 and a second antireflection layer 352. The first antireflection layer 351 is formed on an outer surface 101b of the first substrate 101, where the outer surface 101b is opposite to the inner surface 101a. That is, the first substrate 101 is between the first antireflection layer 351 and the first diffractive layer 211. In the embodiment, the first substrate 101 is between the first antireflection layer 351 and the first index matching layer 341.

Similarly, the second antireflection layer 352 is formed on an outer surface 102b of the second substrate 102, where the outer surface 102b is opposite to the inner surface 102a. That is, the second substrate 102 is between the second antireflection layer 352 and the second diffractive layer 212. In the embodiment, the second substrate 102 is between the second antireflection layer 352 and the second index matching layer 342. Both the first and the second antireflection layers 351 and 352 can reduce the light reflecting off the optical component 300 to cause the optical component 300 transmits more light, thereby improve the optical efficacy.

It is noted that the first index matching layer 341, the second index matching layer 342, the first antireflection layer 351, and the second antireflection layer 352 can be used in the previous embodiments. In other words, at least one of the first index matching layer 341, the second index matching layer 342, the first antireflection layer 351, and the second antireflection layer 352 can be formed in the optical component 100 or 200. Hence, the first index matching layer 341, the second index matching layer 342, the first antireflection layer 351, and the second antireflection layer 352 are not limited to use in the optical component 300.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical component, comprising:
a first substrate;
a first diffractive layer, formed on the first substrate and having a plurality of first depressions, wherein depths of the first depressions are equal;
a second substrate;
a second diffractive layer, formed on the second substrate and having a plurality of second depressions, wherein the depths of the second depressions are equal, wherein the second diffractive layer is disposed opposite to the first diffractive layer, and both the first diffractive layer and the second diffractive layer are located between the first substrate and the second substrate; wherein a gap is formed between the first diffractive layer and the second diffractive layer; and
a bonding material, disposed between the first substrate and the second substrate, and connecting the first substrate and the second substrate,
wherein each of the first depressions has a first sidewall and a first bottom connected to the first sidewall, the first sidewall is perpendicular to the first bottom, and a plurality of widths of the first depressions are not completely the same,
wherein each of the second depressions has a second sidewall and a second bottom connected to the second sidewall, the second sidewall is perpendicular to the second bottom, a plurality of widths of the second depressions are not completely the same, and a width of each of the first depression is different from a width of at least one of the second depressions,
wherein at least one of the first depressions does not overlap with any of the second depressions, while another one of the first depressions overlaps with one of the second depressions,
wherein the first substrate, the second substrate, and the bonding material define a cavity full of gas, and a refractive index difference between the cavity and at least one of the first diffractive layer and the second diffractive layer is 0.3 or over 0.3.

2. The optical component of claim 1, wherein the bonding material is formed between the first diffractive layer and the second diffractive layer, and connected to the first diffractive layer and the second diffractive layer.

3. The optical component of claim 1, wherein the bonding material is directly connected to the first substrate and the second substrate.

4. The optical component of claim 3, wherein the bonding material surrounds the first diffractive layer and the second diffractive layer.

5. The optical component of claim 1, further comprising:
a first index matching layer, formed between the first substrate and the first diffractive layer.

6. The optical component of claim 5, further comprising:
a second index matching layer, formed between the second substrate and the second diffractive layer.

7. The optical component of claim 1, further comprising:
a first antireflection layer, formed on the first substrate, wherein the first substrate is between the first antireflection layer and the first diffractive layer.

8. The optical component of claim 7, further comprising:
a second antireflection layer, formed on the second substrate, wherein the second substrate is between the second antireflection layer and the second diffractive layer.

9. The optical component of claim 1, wherein the first diffractive layer has a first pattern, and the second diffractive layer has a second pattern; wherein the first pattern and the second pattern are formed face to face.

10. The optical component of claim 1, wherein the gap is formed within the cavity.

11. The optical component of claim 10, wherein an air fills the cavity.

12. The optical component of claim 10, wherein a pressure within the cavity is lower than 1 atm.

* * * * *